United States Patent
Watari

(10) Patent No.: US 11,899,661 B2
(45) Date of Patent: Feb. 13, 2024

(54) EXTRACTION METHOD, EXTRACTION DEVICE, AND EXTRACTION PROGRAM

(71) Applicant: NIPPON TELEGRAPH AND TELEPHONE CORPORATION, Tokyo (JP)

(72) Inventor: Yuya Watari, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/913,160

(22) PCT Filed: Apr. 27, 2020

(86) PCT No.: PCT/JP2020/018014
§ 371 (c)(1),
(2) Date: Sep. 21, 2022

(87) PCT Pub. No.: WO2021/220362
PCT Pub. Date: Nov. 4, 2021

(65) Prior Publication Data
US 2023/0145349 A1    May 11, 2023

(51) Int. Cl.
*G06F 16/2453* (2019.01)
*G06F 16/901* (2019.01)

(52) U.S. Cl.
CPC ...... *G06F 16/2453* (2019.01); *G06F 16/9027* (2019.01)

(58) Field of Classification Search
CPC .......... G06F 16/2453; G06F 16/9027
See application file for complete search history.

(56) References Cited

U.S. PATENT DOCUMENTS

2005/0187947 A1*  8/2005  Wortendyke ...... G06F 16/24568
2016/0005092 A1*  1/2016  Jain ...................... G06Q 20/202
                                                            705/26.44

FOREIGN PATENT DOCUMENTS

JP       2014-26331 A    2/2014

OTHER PUBLICATIONS

Roy et al., "Efficient and Extensible Algorithms for Multi Query Optimization", Proceedings of the 2000 ACM SIGMOD International Conference on Management of Data, SIGMOD '00, May 2000, pp. 1-32.
Watari et al., "Query Optimization Using Common Subplan Tree in RDB Execution Plan", DEIM Forum 2019, Available Online At: https://db-event.jpn.org/deim2019/post/papers/371.pdf, Mar. 4, 2019, 15 pages including English Translation.

* cited by examiner

*Primary Examiner* — Hosain T Alam
*Assistant Examiner* — Anthony G Gemignani
(74) *Attorney, Agent, or Firm* — XSENSUS LLP

(57) ABSTRACT

An extraction apparatus (10) is the extraction apparatus that extracts a common plan subtree that is a common part among a plurality of plan trees from the plurality of plan trees, and includes a first assignment unit (11) that calculates, based on information of nodes of a plan tree, a hash value for each node to assign the calculated hash value to the corresponding each node, a second assignment unit (12) that assigns a unique number associated with a set of pointers to each node based on the hash value of each node, and a common plan subtree extraction unit (13) that lists subtrees below a node having the same unique number to extract the common plan subtree from the plurality of plan trees.

12 Claims, 11 Drawing Sheets

| NODE | HASH VALUE | UNIQUE NUMBER |
|---|---|---|
| $e_1$ | 5524 | 6 |
| $e_2$ | 123 | 0 |
| $e_3$ | 123 | 5 |
| $e_4$ | 2232 | 2 |
| $e_5$ | 987 | 3 |
| $e_6$ | 9436 | 7 |
| $e_7$ | 123 | 0 |
| $e_8$ | 5713 | 1 |
| $e_9$ | 2232 | 2 |
| $e_{10}$ | 987 | 3 |

| NODE $e_2$ |
|---|
| $e_2$. type = JOIN OPERATION<br>$e_2$. children = {$e_4$, $e_5$}<br>$e_2$. attributes = {$x^{(1)}$}<br>$x^{(1)}$ = HASH JOIN<br>$e_2$. hash = null<br>$e_2$. id = null |

ALGORITHM 1 CALCULATION OF HASH VALUE OF NODE e

---

1: Input: e.attributes = $\{x^{(1)}, \ldots, x^{(L)}\}$, e.children = $\{e^{(1)}, \ldots, e^{(M)}\}$
2:    function HASH(e)
3:       if e.hash $\neq$ null then
4:          return e.hash
5:       end if
6:
7:       result $\leftarrow$ 0
8:       for all $x^{(i)} \in \{x^{(1)}, \ldots, x^{(L)}\}$ do
9:          result $\leftarrow$ result $\oplus$ $x^{(i)}$
10:      end for
11:      for all $e^{(i)} \in \{e^{(1)}, \ldots, e^{(M)}\}$ do
12:         result $\leftarrow$ result $\oplus$ hash($e^{(i)}$)
13:      end for
14:
15:      e.hash $\leftarrow$ result
16:      return result
17:    end function

Fig. 9

| ALGORITHM 2 CALCULATION OF UNIQUE NUMBER OF NODE e |
|---|

1: Input: e, array ← ASSOCIATIVE ARRAY, next_id ← UNIQUE NUMBER TO BE ASSIGNED ANEW
2:    function ID(e)
3:       if e.id ≠ null then
4:          return e.id
5:       end if
6:
7:       if array[hash(e)] is not empty then
8:          for all p ∈ array[hash(e)] do
9:             if equals(p.pointers[0], e) then
10:               p.pointers ← p.pointers ∪ {e}
11:               e.id ← p.id
12:               return p.id
13:             end if
14:          end for
15:       end if
16:
17:       p ← empty_pair
18:       p.id ← next_id++
19:       p.pointers ← {e}
20:       array[hash(e)] ← array[hash(e)] ∪ p
21:       e.id ← p.id
22:       return p.id
23:    end function

Fig. 10

| ALGORITHM 3 DETERMINATION WHETHER NODE e AND e′ IS SAME |
|---|
| 1: Input: e.attributes = $\{x^{(1)}, \ldots, x^{(L)}\}$, e.children = $\{e^{(1)}, \ldots, e^{(M)}\}$, e′.attributes = $\{x'^{(1)}, \ldots, x'^{(L')}\}$, e′.children = $\{e'^{(1)}, \ldots, e'^{(M')}\}$, |
| 2:    function EQUALS(e, e′) |
| 3:      if e.type $\neq$ e′.type then |
| 4:        return false |
| 5:      end if |
| 6:      for all i $\in \{1, \ldots, M\}$ do |
| 7:        if $x^{(i)} \neq x'^{(i)}$ then |
| 8:          return false |
| 9:        end if |
| 10:      end for |
| 11:      for all i $\in \{1, \ldots, L\}$ do |
| 12:        if $id(e^{(i)}) \neq id(e'^{(i)})$ then |
| 13:          return false |
| 14:        end if |
| 15:      end for |
| 16:      return true |
| 17:    end function |

EXTRACTION METHOD, EXTRACTION DEVICE, AND EXTRACTION PROGRAM

CROSS-REFERENCE TO RELATED APPLICATION

The present application is based on PCT filing PCT/JP2020/018014, filed Apr. 27, 2020, the entire contents of which are incorporated herein by reference.

TECHNICAL FIELD

The present invention relates to an extraction method, an extraction apparatus and an extraction program.

BACKGROUND ART

In the related art, a method is proposed in which a common part between queries is executed in a shared manner for the purpose of speedup in the case where a batch of a plurality of analysis queries is issued in a database (see NPL 1).

To be more specific, two queries $Q_1$ (see the expression (1)) and query $Q_2$ (see the expression (2)) are described as examples. Each of the queries $Q_1$ and $Q_2$ is join operation among three tables and has the join operation expressed in the expression (3) as a common part. Note that A, B, C, and D represent tables.

[Math. 1]
$$A \bowtie B \bowtie C \quad (1)$$

[Math. 2]
$$A \bowtie B \bowtie D \quad (1)$$

[Math. 3]
$$A \bowtie B \quad (1)$$

In this case, the speed of the query execution may be increased by executing the common part expressed in the expression (3) only once and holding and reusing the result for both queries. Such an execution technique of sharing the common part is called multi-query optimization. The multi-query optimization leads to reduction of the execution time of the analysis query, and NPL 1 discloses a method that reduced the query execution time by about half in an evaluation experiment.

Such a speedup method is important to increase the degree of freedom in analysis systems. In analysis systems such as an analysis dashboard, the query that can be issued by the user is restricted in some situation in consideration of the response time to the user and the performance of the entire system. For such a problem in which the degree of freedom of analysis is restricted, the multi-query optimization is useful for increasing the performance of the database.

CITATION LIST

Non Patent Literature

[NPL 1] P. Roy, S. Seshadri, S. Sudarshan, and S. Bhobe, "Efficient and Extensible Algorithms for Multi Query Optimization", Proceedings of the 2000 ACM SIGMOD International Conference on Management of Data, SIGMOD '00, New York, NY, USA, ACM, pp. 249-260 (2000).

SUMMARY OF THE INVENTION

Technical Problem

When optimization is performed using the known method, the time required for finding the common part (hereinafter referred to as extraction time) becomes necessary in addition to the execution time of the query itself. In the known method, the extraction is performed by expressing a query as a directed acyclic graph. The extraction time increases along with the number of queries executed at once and is 35 seconds when a batch of 22 queries is executed, for example.

As such, in the case of a query whose original execution time is about several tens of seconds and the case where the number of queries for batch execution is very large, the length of the extraction time disadvantageously becomes non-negligible. One reason for the above-described restriction on the degree of freedom of the analysis is to suppress the response time. In the case where the extraction time is in seconds as in the known method, the response time increases, and the object of improving the degree of freedom cannot be fully achieved.

In view of this, an object of the present invention is to provide an extraction method, an extraction apparatus and an extraction program that can reduce the extraction time of the common part while sufficiently reducing the query execution time.

Means for Solving the Problem

To solve the above-described problems, an extraction method according to the present invention is the extraction method executed by an extraction apparatus, which extracts a common plan subtree that is a common part among a plurality of plan trees from the plurality of plan trees, and includes calculating, based on pieces of information of nodes of a plan tree of the plurality of plan trees, a hash value for each of the nodes to assign the calculated hash value to the corresponding each of the nodes, assigning a unique number associated with a set of pointers to each of the nodes based on the hash value of each of the nodes, and listing subtrees below a node of the nodes having the unique number identical, to extract the common plan subtree from the plurality of plan trees.

An extraction apparatus according to the present invention is the extraction apparatus that extracts a common plan subtree that is a common part among a plurality of plan trees from the plurality of plan trees, and includes a first assignment unit that calculates, based on pieces of information of nodes of a plan tree of the plurality of plan trees, a hash value for each of the nodes to assign the calculated hash value to the corresponding each of the nodes, a second assignment unit that assigns a unique number associated with a set of pointers to each of the nodes based on the hash value of each of the nodes, and an extraction unit that lists subtrees below a node of the nodes having the unique number identical, to extract the common plan subtree from the plurality of plan trees.

An extraction program according to the present invention causes a computer to execute calculating, for a plurality of plan trees, based on pieces of information of nodes of a plan tree of the plurality of plan trees, a hash value for each of the nodes to assign the calculated hash value to the corresponding each of the nodes, assigning a unique number associated with a set of pointers to each of the nodes based on the hash value of each of the nodes, and listing subtrees below a node of the nodes having the unique number identical, to extract a common plan subtree, which is a common part among the plurality of plan trees, from the plurality of plan trees.

Effects of the Invention

According to the present invention, it is possible to reduce the extraction time of the common part while sufficiently reducing the query execution time.

BRIEF DESCRIPTION OF DRAWINGS

FIG. 7 is a diagram illustrating an example of an algorithm used by a first assignment unit illustrated in FIG. 3.

FIG. 9 is a diagram illustrating an example of an algorithm used by the second assignment unit illustrated in FIG. 3.

FIG. 10 is a diagram illustrating an example of an algorithm used by the second assignment unit illustrated in FIG. 3.

DESCRIPTION OF EMBODIMENTS

Figure 1:
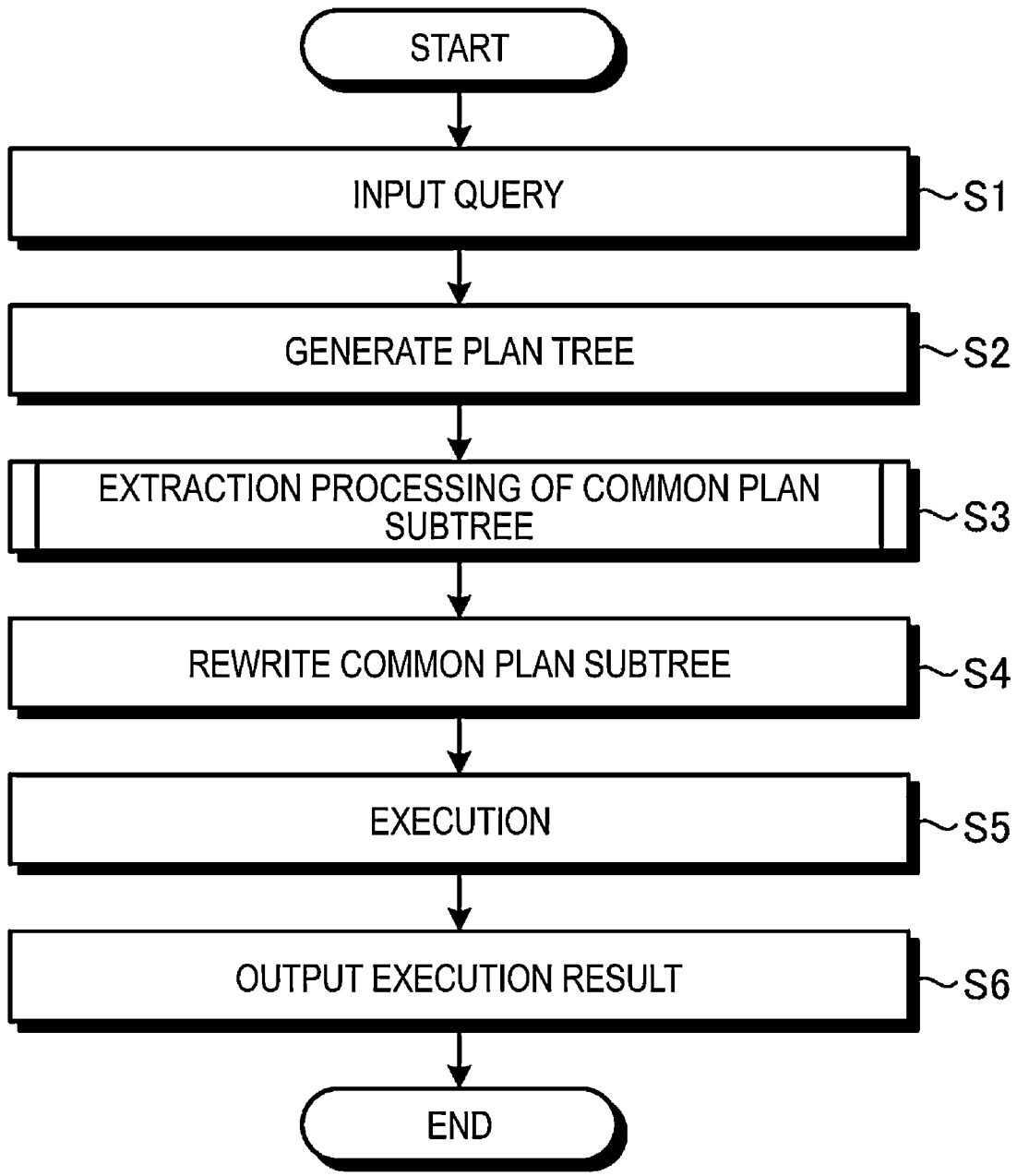
FIG. 1 is a flowchart of processing in multi-query optimization.

An embodiment of the present invention is elaborated below with reference to the accompanying drawings. Note that the present invention is not limited to the embodiment. In addition, in the drawings, the same parts are denoted by the same reference numerals.

Overview of Multi-Query Optimization First, an overview of multi-query optimization is described. FIG. 1 is a flowchart of processing in multi-query optimization. As illustrated in FIG. 1, a query is converted to an execution plan by relational database (RDB).

Figure 2:
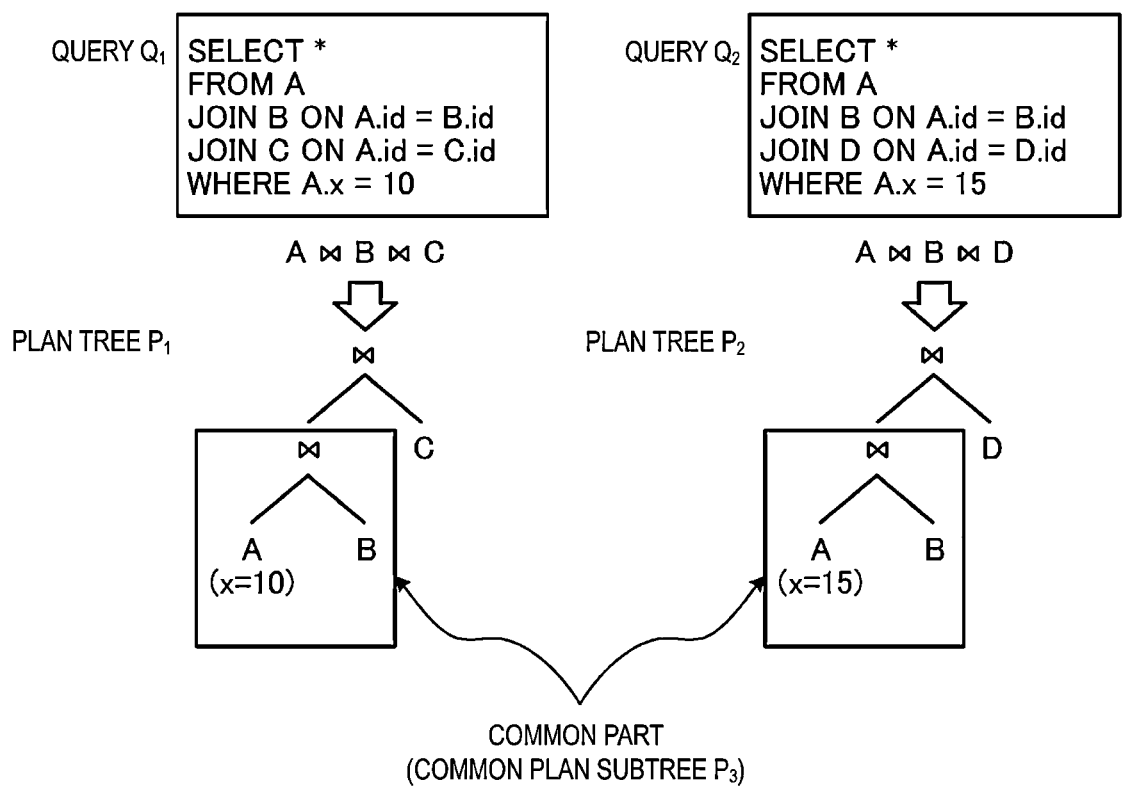
FIG. 2 is a diagram illustrating an example of a plan tree.

Here, a tree structure that represents an execution plan is referred to as plan tree. FIG. 2 is a diagram illustrating an example of a plan tree. FIG. 2 illustrates plan trees of two queries, query $Q_1$ (see the expression (4)) and query $Q_2$ (see the expression (5)). In addition, the same subtrees of plan trees are referred to as common plan subtree. Note that specific definitions of the subtree and the common plan subtree are described below.

[Math. 4]

$$A \bowtie B \bowtie C \qquad (4)$$

[Math. 5]

$$A \bowtie B \bowtie D \qquad (1)$$

In the multi-query optimization, when a query is input (step S1), a planner generates a plan tree (step S2). In the multi-query optimization, the same subtrees of plan trees are extracted as a common plan subtree (step S3). In the multi-query optimization, the common plan subtree is rewritten (step S4). Subsequently, in the multi-query optimization, the query is executed by an executer (step S5), and the execution result is output (step S6).

In the multi-query optimization, the common plan subtree is extracted from the plurality of plan trees (step S3), and its result is stored in a memory or disk. Then, in the multi-query optimization, the stored result is reused to eliminate performing the same operation multiple times. In the example illustrated in FIG. 2, the join operation expressed in the expression (6) is extracted as a common plan subtree $P_3$, and its result is shared between the two queries.

[Math. 6]

$$A \bowtie B \qquad (1)$$

In this manner, in the example illustrated in FIG. 2, this operation is not executed twice, and thus the execution time is reduced. The present embodiment speeds up the extraction processing (step S3) of the common plan subtree illustrated in FIG. 1, that is, processing of finding a common plan subtree from a query.

Definitions of Subtree and Common Plan Subtree

A definition of subtree is described below. A subtree is a tree composed of a certain node in a plan tree as a root, all descendant nodes below the node, and edges. The same two subtrees mean that the trees have the same structure and that the corresponding nodes in the structure are the same operations. It should be noted that the difference in conditional phrase is not taken into consideration in the determination of this identity.

In the example illustrated in FIG. 2, the two subtrees in the frames of plan trees $P_1$ and $P_2$ are executed under different conditions in terms of column x of the table A. The subtree of the plan tree $P_1$ is for the record where A.x=10, and the subtree of the plan tree $P_2$ is for the record where A.x=15. However, this difference is ignored, and the two subtrees in the frames of the plan trees $P_1$ and $P_2$ are regarded as the same subtree. The reason for this is to enable shared execution of queries with different conditional phrases. In the case where the same subtree appears multiple times in common, such a subtree is referred to as common plan subtree, and, in the multi-query optimization, the common plan subtree is executed in a shared manner.

Extraction Apparatus

Figure 3:
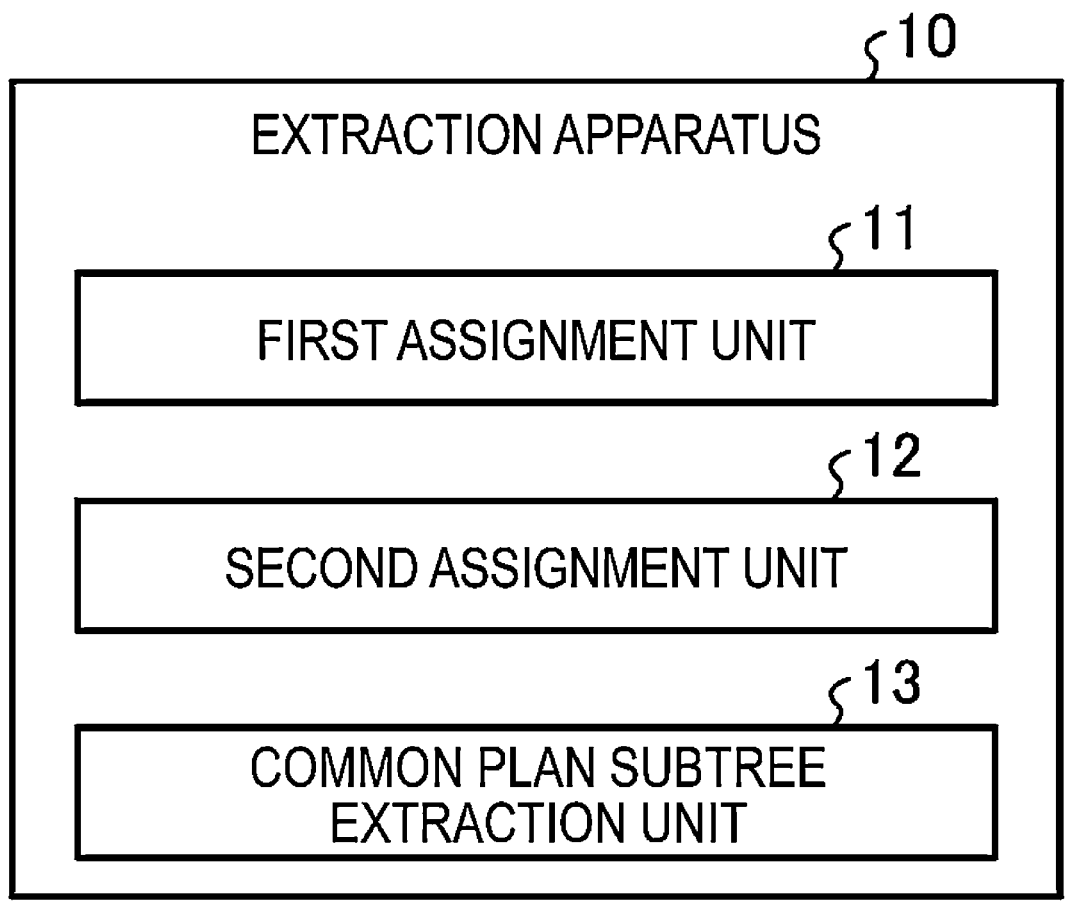
FIG. 3 is a block diagram illustrating an example of a configuration of an extraction apparatus according to an embodiment.

Next, with reference to FIG. 3, an extraction apparatus 10 according to the present embodiment is described. FIG. 3 is a block diagram illustrating an example of a configuration of an extraction apparatus according to the embodiment. In the multi-query optimization, the extraction apparatus 10 extracts a common plan subtree, which is a common part of a plurality of plan trees, from the plurality of plan trees.

As described above, a subtree is a tree with a certain node in a plan tree as a root, and therefore the determination whether two subtrees are the same can be expressed as a determination whether the root node is the same. In view of this, the extraction apparatus 10 assigns, to the nodes in a plan tree, unique numbers for uniquely identifying the nodes, and, when the unique numbers are the same, the extraction apparatus 10 determines that the subtrees below the node are the common plan subtree.

The extraction apparatus 10 includes a first assignment unit 11, a second assignment unit 12 and a common plan subtree extraction unit 13. The first assignment unit 11 calculates the hash value for each node of the plan tree on the basis of the information of each node of the plan tree and assigns the calculated hash value to each corresponding node. The second assignment unit 12 assigns, to each node, a unique number associated with a set of pointers to the node on the basis of the hash value of each node. The common plan subtree extraction unit 13 extracts a common plan subtree from a plurality of plan trees by listing the subtrees below the node with the same unique number.

Figure 4:
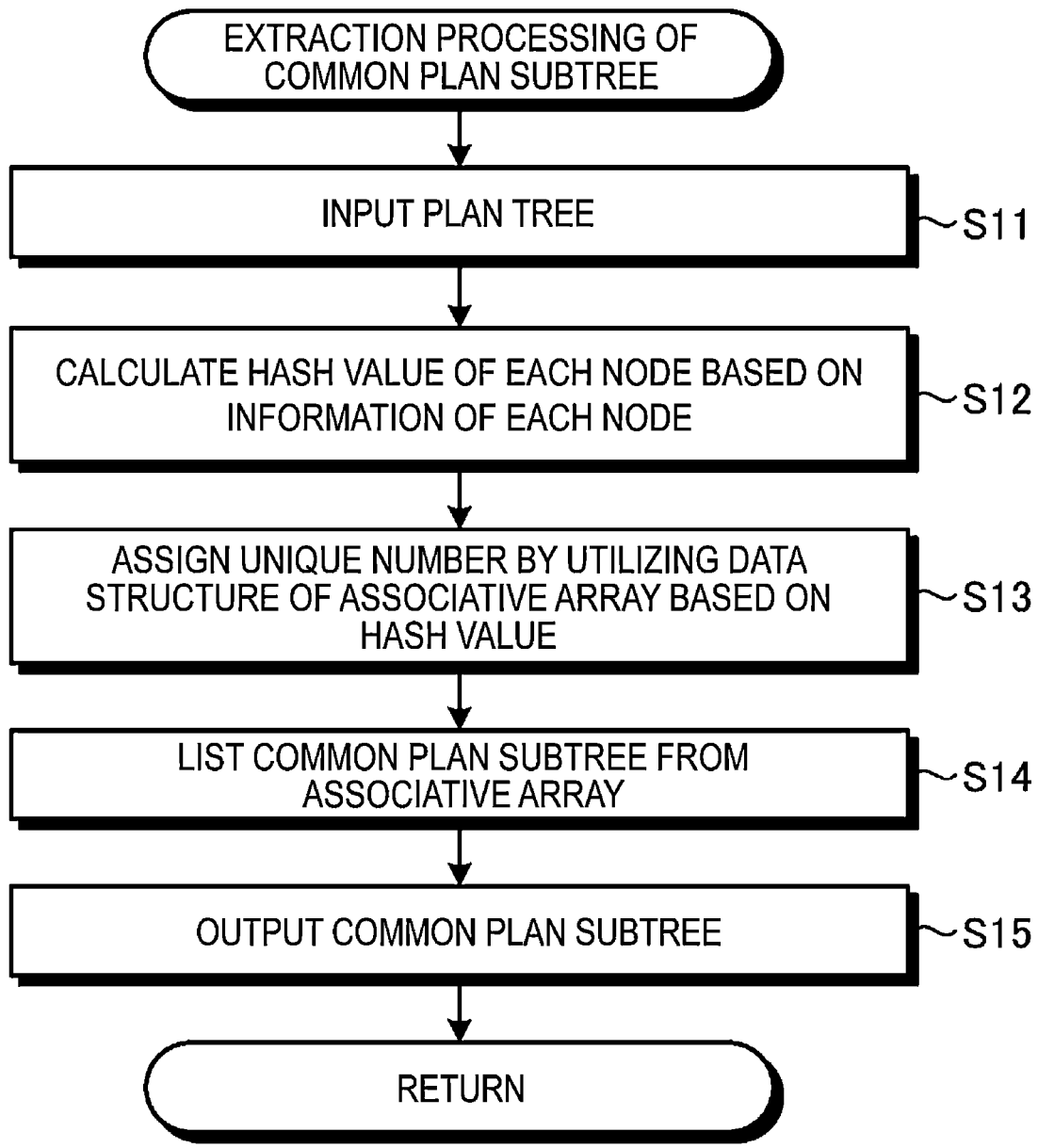
FIG. 4 is a flowchart of a processing procedure of extraction processing according to the embodiment.

FIG. 4 is a flowchart of a processing procedure of extraction processing according to the embodiment. As illustrated in FIG. 4, when receiving an input of a plan tree (step S11), the first assignment unit 11 calculates the hash value of each node of the plan tree on the basis of the information of each node of the plan tree (step S12), and assigns the hash value to each node of the plan tree. The first assignment unit 11 outputs the plan tree in which the hash value is assigned to each node.

The second assignment unit 12 assigns a unique number to each node by utilizing a data structure of an associative array on the basis of the hash value of each node (step S13). The second assignment unit 12 outputs the plan tree in which the unique number is assigned to each node and the associative array. The associative array has a data structure with a hash value calculated by the first assignment unit 11 as a key, and the array as a value. The array of the value of the associative array has, as an element, a pair of (a unique number and a set of pointers to the node having the unique number) the plan tree with the hash value as the key.

The common plan subtree extraction unit 13 extracts a common plan tree from the associative array by listing the subtrees below the node having the same unique number as a common plan subtree (step S14). The common plan subtree extraction unit 13 outputs the extracted common plan subtree (step S15).

On the basis of information of the node, the first assignment unit 11 calculates the hash value (integer value) representing the node. This calculation of the hash value is described below. This hash value has the same value when the node is the same but may have the same value even when the nodes are different from each other, thus causing a collision. In view of this, the second assignment unit 12 performs the assignment of the unique number for uniquely identifying the node. The subtrees below the nodes having the same unique number are the common plan subtree.

Figure 5:
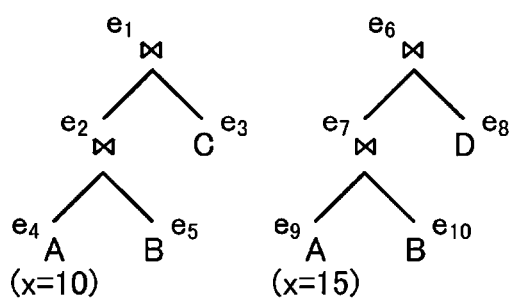
FIG. 5 is a diagram illustrating an example of a hash value and a unique number for each node of a plan tree.

FIG. 5 is a diagram illustrating an example of a hash value and a unique number for each node of the plan trees $P_1$ and $P_2$. In the two plan trees, a node $e_2$ of the plan tree $P_1$ on the left side and a node $e_7$ of the plan tree $P_2$ on the right side are the same as illustrated in FIG. 2, and therefore the same hash value "123" is assigned to them as illustrated in the table of FIG. 5. However, the same hash value "123" is also assigned to a node $e_3$, which is different from them, thus causing a collision.

In order to discriminate them even in a situation with such a collision, the second assignment unit 12 allocates "0" to $e_2$ and $e_7$ and "5" to $e_3$ as unique numbers. The common plan subtree extraction unit 13 extracts, as the common plan subtree, the subtrees below the nodes with the same unique number, not hash value.

Information Held by Each Node

Figure 6:
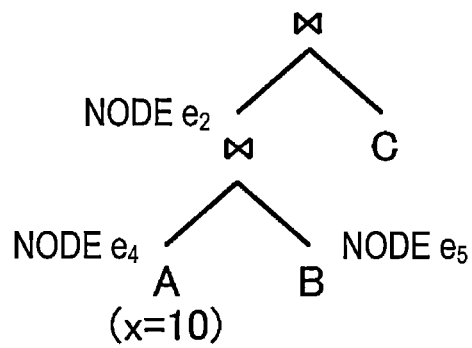
FIG. 6 is a diagram illustrating information held by each node of a plan tree and its example.

Next, information held by each node of a plan tree is described. FIG. 6 is a diagram illustrating information held by each node of a plan tree and its example.

The node e has, as information, "e.type" representing the node type, "e.attributes", which is a set of the attributes of the node, "e.children", which is a set of child nodes of the node, a hash value "e.hash", and a unique number "e.id". It is denoted as "e.attributes=$\{x^{(1)}, \ldots, x^{(L)}\}$, e.children=$\{e^{(1)}, \ldots, x^{(M)}\}$" where L is the number of attributes and M is the number of child nodes.

The e.type, which is the type of the node, represents the type of operation such as join operation, sorting and table scan. In the case of join operation, $x^{(1)}, \ldots, x^{(L)}$ is the type of the join operation (such as hash join and merge join) and/or the join condition. In the case of table scan, $x^{(1)}, \ldots, x^{(L)}$ is the identifier of the table as the scanning target. For them, the integer value expression is determined by an appropriate method. In the case of join operation, $e^{(1)}, \ldots, e^{(m)}$ is the inner table and the outer table, and the like.

The example of FIG. 6 illustrates, in the frame, these information for the node $e_2$ of the join operation (see the expression (7)) in the join operation expressed in the expression (6).

[Math. 7]

$$\bowtie \qquad (7)$$

In this example, $e_2$.type and $x^{(1)}$ are integer value expressions representing a join operation and a hash join, respectively. The hash value e.hash and the unique number e.id are substituted by "null" when the value is not calculated. These values are calculated in an algorithm 1 and algorithm 2 described below for substitution. The extraction apparatus 10 records the hash value e.hash and the unique number e.id at the node as information in association with the node, and thus avoids the calculation of these values multiple times for the same node.

Processing of First Assignment Unit

Next, processing of assigning the hash value of each node executed by the first assignment unit 11 is described. The first assignment unit 11 calculates the hash value of each node, and substitutes the result into e.hash. Thereafter, the hash value of the node e is denoted as hash(e).

The first assignment unit 11 sequentially calculates the hash value in the direction from the leaf node to the root node of the plan tree and assigns it to each node. FIG. 7 is a diagram illustrating an example of an algorithm used by the first assignment unit 11 illustrated in FIG. 3. The first assignment unit 11 determines the hash(e) by using the algorithm illustrated in the algorithm 1 illustrated in FIG. 7.

In the algorithm 1, the hash value of the node e is calculated with e.attributes=$\{x^{(1)}, \ldots, x^{(L)}\}$e.children=$\{e^{(1)}, \ldots, e^{(M)}\}$ as the input. Here, when the hash value has already been calculated, it is reused (lines 3 to 5 of the algorithm 1). Note that the result is truncated to a 32-bit integer. In the algorithm 1, the hash(e) is determined from the exclusive logical sum of the attribute integer value expressions $x^{(1)}, \ldots, x^{(L)}$ and the hash values hash$(e^{(1)}), \ldots,$ hash$(e^{(M)})$ of all child nodes, and the determined result is recorded (lines 8 to 15 of the algorithm 1).

The hash value is sequentially assigned in the direction from the leaf node to the root node of the plan tree as described above, and therefore, at the time point when the hash(e) is determined, the hash$(e^{(1)}), \ldots,$ hash$(e^{(m)})$, which are the hash values of the child nodes, have already been calculated and known. Further, because the number L of the attributes in the RDB, and the number M of child nodes are constants, the calculation of the hash(e) can be made in constant time. Accordingly, for all nodes e, the first assignment unit 11 can calculate the hash value hash(e) with the computational complexity of O(N) where N represents the number of the nodes in the plan tree.

Processing of Second Assignment Unit

Next, processing of assigning a unique number to each node executed by the second assignment unit 12 is described. The unique number of the node e is denoted as id(e).

Figure 8:
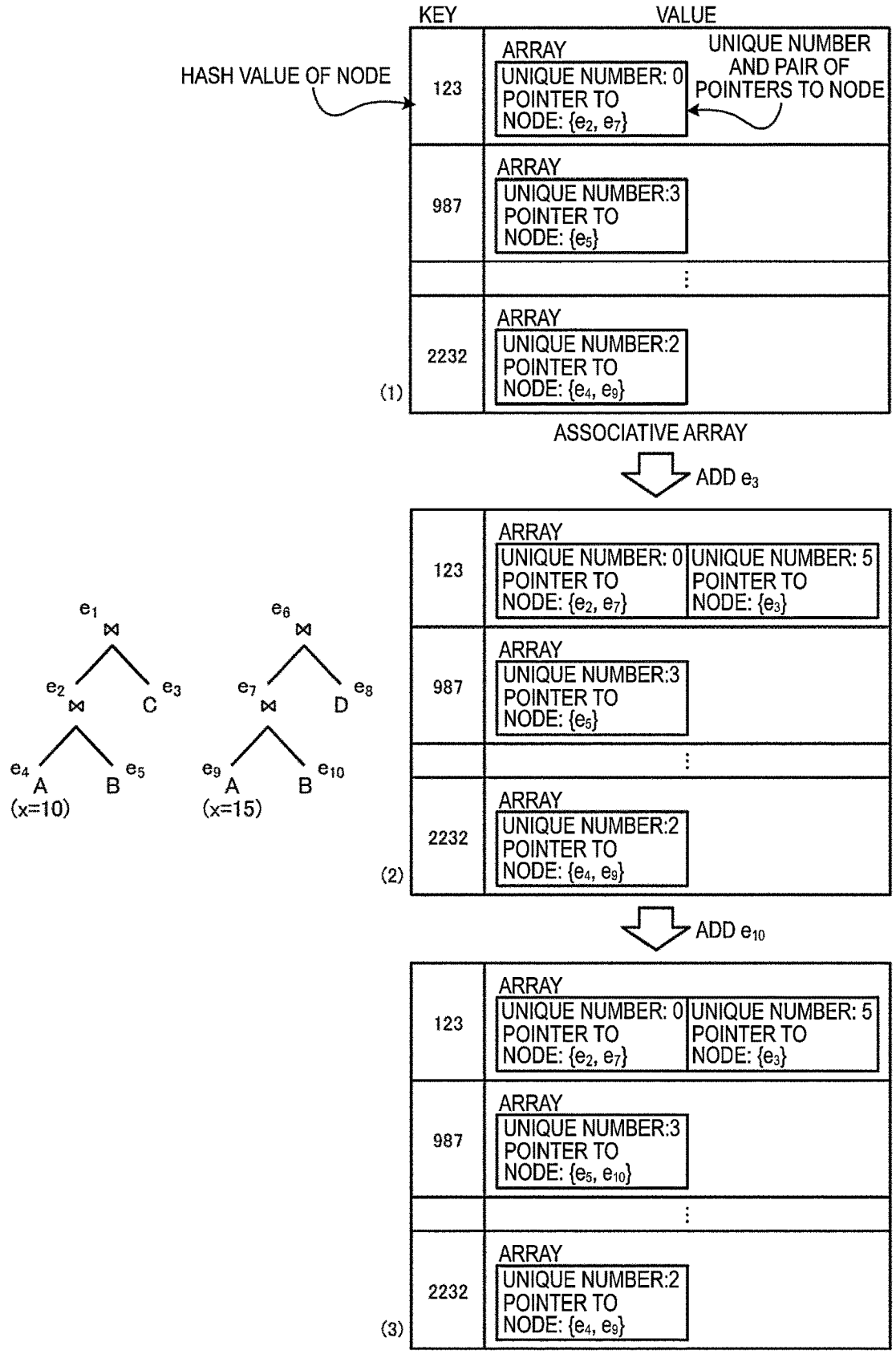
FIG. 8 is a diagram for describing an example of an associative array used by a second assignment unit illustrated in FIG. 3.

As with the above-mentioned hash value, the second assignment unit 12 sequentially assigns the unique number to each node in the direction from the leaf node to the root node of the plan tree. FIG. 8 is a diagram for describing an example of an associative array used by the second assignment unit 12 illustrated in FIG. 3.

This associative array has the hash value calculated by the first assignment unit 11 as a key and has the array as a value. Specifically, when the associative array is denoted as array, array [hash(e)] is an array. This array as a value has, as an element, a pair of (a unique number and a set of pointers to the node having the unique number) the plan tree having the hash(e) as the hash value.

In the example illustrated in FIG. 8, there is one pair (element) in the array[123] for the hash value "123". This pair is a pair p=(0, $\{e_2, e_7\}$) of the unique number "0" and the node having the unique number "0", that is, a set of pointers to the nodes $e_2$ and $e_7$ (see (1) of FIG. 8). Likewise, it includes a pair p=(3, $\{e_5\}$) of the unique number "3" and a pointer to node $e_5$ for the hash value "987". By constructing this associative array, the second assignment unit 12 determines the unique number for all nodes.

A hash table is used as specific implementation of the associative array. Specifically, a table with the length of an appropriate prime number "prime" is used as the associative array. Reference to array[hash(e)] is reference to an index hash(e) mod prime of this table.

FIG. 9 is a diagram illustrating an example of an algorithm used by the second assignment unit 12 illustrated in FIG. 3. The second assignment unit 12 calculates the unique number by using the algorithm 2 illustrated in FIG. 9.

In the algorithm 2, the associative array is searched with the node e to which the unique number is to be assigned, the associative array, and the unique number to be assigned anew as the input, and with the hash value hash(e) of the node e to which the unique number is to be assigned as a key. Here, when the unique number has already been calculated, it is reused (lines 3 to 5 of the algorithm 2).

In the algorithm 2, when there is no pair in the array[hash (e)], the next pair p is added at end of the associative array array[hash(e)], and thereafter new unique number is assigned to the node as id(e) (lines 17 to 21 of the algorithm 2). As expressed in the expression (8), p is a pair of the unique number (id) and a set of pointers "pointers" of the node corresponding to the unique number.

[Math. 8]

$$p = (\text{NEW UNIQUE NUMBER}, \{\text{POINTER TO NODE } e\}) \quad (8)$$

On the other hand, a case where there is a pair in the array [hash(e)] is described below. In this case, in the algorithm 2, when the node indicated by each pair and the node e to which the unique number is to be currently assigned are compared with each other and there is a match, the node e as a pointer is added to a set of pointers, and thereafter its unique number is assigned to the node as id(e), and the result is recorded (lines 9 to 11 of the algorithm 2). Note that the p.pointer[0] is an any element in p.pointer.

On the other hand, in the algorithm 2, when the node indicated by each pair and the node e to which the unique number is to be currently assigned are compared with each other and there is no match, new unique number is allocated to the array [hash(e)] as with the case where there is no pair (lines 9 to 11 of the algorithm 2).

With reference to FIG. 8, the processing operations of the algorithm 2 are described. FIG. 8 illustrates, as an example, a method of utilizing the associative array when determining the unique numbers id($e_3$) and id($e_{10}$) of the nodes $e_3$ and $e_{10}$. When the hash value of the node $e_3$ is hash($e_3$)=123, the second assignment unit 12 searches the content of the array[123] first. In the state of (1) in FIG. 8, there is the pair of $e_2$ and $e_7$ of the unique number "0" in the array [123]. Therefore, the second assignment unit 12 determines whether this pair is the same as the node $e_3$, that is, whether $e_2$ (or $e_7$) and $e_3$ are the same. Here, since $e_2$ (or $e_7$) and $e_3$ are not the same, the second assignment unit 12 allocates a new unique number "5" that is not yet in use to the node $e_3$. In this manner, the associative array is set to the state of (2) in of FIG. 8.

Subsequently, the second assignment unit 12 determines the unique number id($e_{10}$) of $e_{10}$. In the case of hash ($e_{10}$)=987, the second assignment unit 12 searches the content of the array[987]. In the state of (2) in FIG. 8, there is the node $e_5$ with the unique number "3" in the array[987]. Then, the second assignment unit 12 determines whether $e_5$ and $e_{10}$ are the same. In this example, $e_5$ and $e_{10}$ are the same node, and therefore, the unique number id($e_{10}$) is "3", and $e_{10}$ is added to a set of pointers to the node of the pair as illustrated in (3) in FIG. 8.

In this manner, in the processing executed by the second assignment unit 12, a comparison between two nodes is performed. In the example illustrated in FIG. 8, this corresponds to the comparison between $e_2$ and $e_3$, and the comparison between $e_5$ and $e_{10}$. To determine whether two nodes e and e' are the same in this manner, the second assignment unit 12 uses an algorithm 3 illustrated in FIG. 10.

FIG. 10 is a diagram illustrating an example of an algorithm used by the second assignment unit 12 illustrated in FIG. 3. As illustrated in the algorithm 3, the second assignment unit 12 performs comparison between the types of the comparison target (e.type and e'.type), between the attributes (e.attribute and e'.attribute), and between the unique numbers of child nodes (e.children and e'.children). The second assignment unit 12 determines that they are the same when all of them match each other (lines 3 to 16 of the algorithm 3).

Here, L and M in the algorithm 3 are constants. Because the algorithm 3 is executed in the direction from the leaf node to the root node, the id($e_i$) and id($e'_i$) that are the unique numbers of the child nodes have already been calculated and can be acquired in a constant time. Thus, the second assignment unit 12 can determine the match of the equals(e, e') in a constant time as a whole.

Processing of Common Plan Subtree Extraction Unit

Next, processing of the common plan subtree extraction unit 13 is described. As illustrated in (3) in FIG. 8, the associative array includes unique numbers and sets of pairs of pointers to the nodes corresponding to the unique numbers. The common plan subtree extraction unit 13 can list the common plan subtree by checking all pairs in the associative array. The common plan subtree extraction unit 13 can list the nodes indicated by a set of pairs of pointers to nodes having the same unique number and can extract the subtrees below the listed nodes as the common plan subtree. Thus, the common plan subtree extraction unit 13 does not need to perform checking of the combinations of queries in a round-robin manner.

Effects of Embodiment

In the above-mentioned manner, in the present embodiment, the speed of the extraction of the common part expression, which uses scanning of directed acyclic graph in the known extraction method, is increased through the hash value and the match determination of the unique number of each node based on the hash value, with a small computational complexity.

That is, in the present embodiment, the common plan subtree is extracted by directly utilizing the plan tree generated by the RDB without generating the directed acyclic graph that uses high-cost scanning, and the match determination of nodes is speedily performed using hash values and unique numbers that can be easily compared as integers. Then, in the present embodiment, the calculation of the hash value and the unique number performed in the direction from the leaf node to the root node eliminates the multiple scanning of the tree, and thus these values can be speedily calculated. Then, in the present embodiment, it is possible to list a set of the same plan trees, that is, common plan subtrees, by using the data structure utilizing the associative array, without the round-robin check of the issued combinations of queries.

The computational complexity in the extraction apparatus 10 was actually evaluated. As a result, the processing operations of step S11 to step S15 executed by the extraction apparatus 10 can be executed with a computational complexity of O(N), where N is the number of the nodes in the plan tree. To be more specific, the extraction apparatus 10 was implemented for multi-query optimization and evaluated, and as a result, the extraction time of the common plan subtree in a batch execution of 22 queries was reduced to 9.8 milliseconds. In the case of the known extraction method, the extraction time of the common plan subtree in the same batch execution of 22 queries is as long as 35 seconds.

In this manner, the extraction apparatus 10 can considerably reduce the extraction time of the common plan subtree. In addition, as a result of the shared execution of the common part extracted by the extraction apparatus 10, the query execution time was up to 18.1 times faster, and 4.5 times faster on average. Because the maximum speedup rate obtained by the known extraction method is about 2 times, the negative influence on the speedup of the query execution due to a change from the known extraction method to the extraction method according to the present embodiment is recognized to be either non-existent or sufficiently low.

Thus, according to the present embodiment, the extraction time of the common plan subtree in the multi-query optimization can be considerably reduced to a few milliseconds. In this manner, according to the present embodiment, the application range is enlarged because the multi-query optimization can be applied also in the case of a query whose execution time of the query itself is completed in about several tens of seconds and a case where the number of simultaneous executions is greater than 100. In other words, according to the present embodiment, the problem of the extraction time in the related art is solved, and the multi-query optimization can be applied to the workload in which a query with a short execution time is issued. In addition, according to the present embodiment, also in a workload in which a query of a type different from an analysis query to be executed in less than a second is mixed, the reduction in performance due to the multi-query optimization does not occur. Thus, the present embodiment can speedup analysis systems in which short response times are desired. Further, the algorithm used in the present embodiment is applicable to wide variety of database by incorporating it into the planner in the relational database, and thus can reduce the restrictions on the degree of freedom.

System Configuration of Embodiment

Each component of the extraction apparatus 10 illustrated in FIG. 1 is a functional concept and may not necessarily be physically configured as in the drawing. That is, the specific form of distribution and integration of the functions of the extraction apparatus 10 is not limited to the illustrated form, and the entirety or a portion of the form can be configured by being functionally or physically distributed and integrated in any unit, depending on various loads, usage conditions, and the like.

All or some of processing operations performed by the extraction apparatus 10 may be implemented by a CPU and a program that is analyzed and executed by the CPU. The processing operations performed by the extraction apparatus 10 may be implemented as hardware by a wired logic.

All or some of the processing operations described as being automatically performed among the processing operations described in the embodiment may be manually performed. Alternatively, all or some of the processing operations described as being manually performed can be automatically performed using a publicly known method. In addition, the processing procedures, control procedures, specific names, and information including various types of data and parameters described and illustrated above can be appropriately changed unless otherwise specified.

Program

Figure 11:
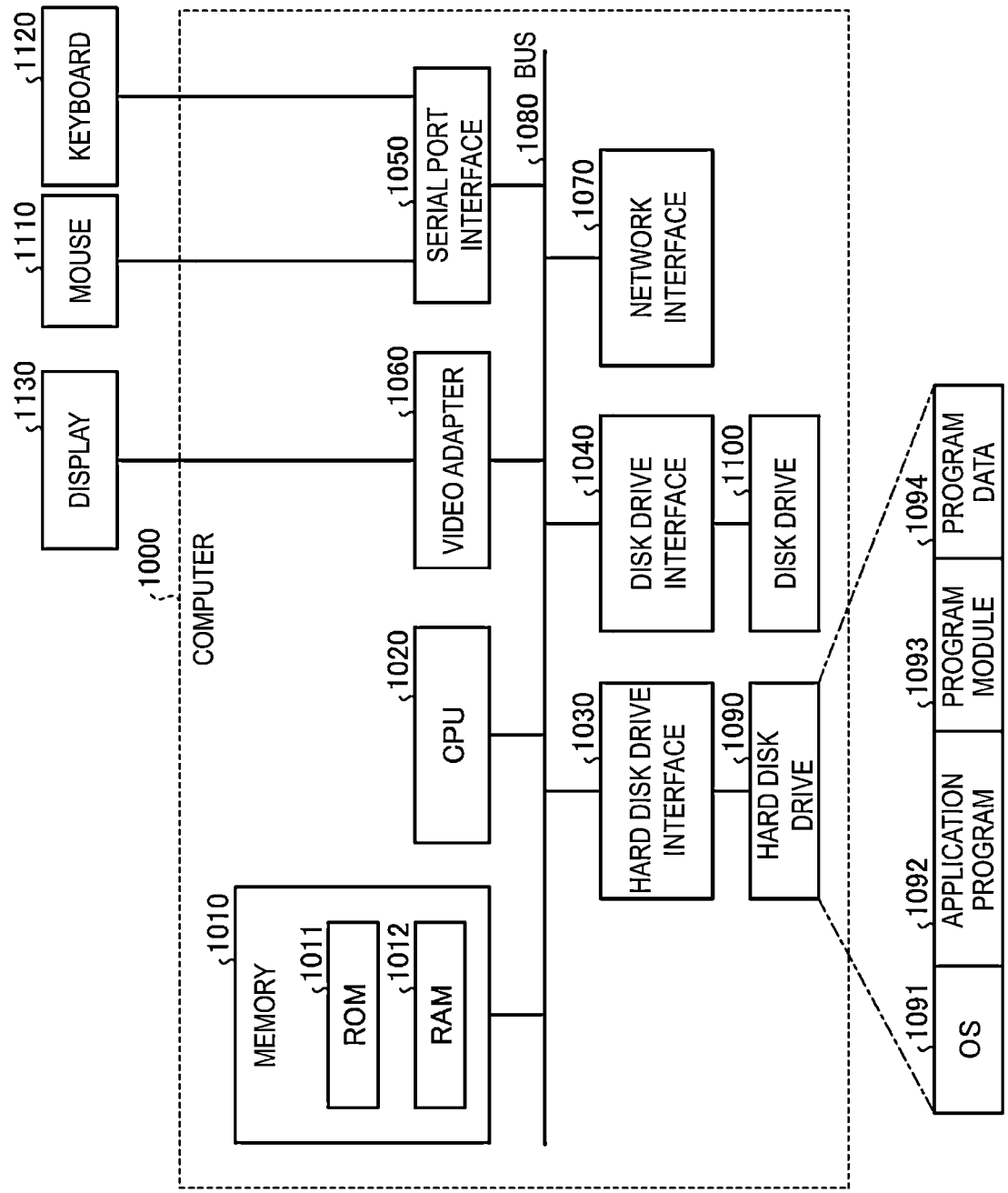
FIG. 11 is a diagram illustrating an example of a computer that implements an extraction apparatus when a program is executed.

FIG. 11 is a diagram illustrating an example of a computer that implements the extraction apparatus 10 when a program is executed. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. Each of these units is connected by a bus 1080.

Memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and a program data 1094. That is, a program defining each of the processing operations of the extraction apparatus 10 is implemented as the program module 1093 in which codes executable by the computer 1000 is described. The program module 1093 is stored in, for example, the hard disk drive 1090. For example, the program module 1093 for executing the same processing as that performed by the functional configurations in the extraction apparatus 10 is stored in the hard disk drive 1090. Further, the hard disk drive 1090 may be replaced with a solid state drive (SSD).

Further, configuration data to be used in the processing of the embodiment described above is stored as the program data 1094 in, for example, the memory 1010 or the hard disk drive 1090. In addition, the CPU 1020 reads the program module 1093 and the program data 1094 stored in the memory 1010 or the hard disk drive 1090 into the RAM 1012 and executes them, as necessary.

The program module 1093 and the program data 1094 are not limited to being stored in the hard disk drive 1090 and, for example, may be stored in a detachable storage medium and read by the CPU 1020 via the disk drive 1100 or the like. Alternatively, the program module 1093 and the program data 1094 may be stored in another computer connected via a network (a local area network (LAN), a wide area network (WAN), or the like). The program module 1093 and the program data 1094 may be read by the CPU 1020 from another computer via the network interface 1070.

The embodiment to which the invention made by the present inventor is applied have been described above, but the present invention is not limited to the description and the drawings, which form a part of the disclosure of the present invention according to the present embodiment. That is, all other embodiments, examples, operation techniques, and the like made by those skilled in the art based on the present embodiment are included in the scope of the present invention.

REFERENCE SIGNS LIST

- 10 Extraction apparatus
- 11 First assignment unit
- 12 Second assignment unit
- 13 Common plan subtree extraction unit

The invention claimed is:

1. An extraction method executed by an extraction apparatus to optimize multiple queries and reduce a time to extract a common plan subtree that is a common part among a plurality of plan trees corresponding to the multiple queries by avoiding use of acyclic graphs, the extraction method comprising:
   calculating, based on pieces of information of nodes of a plan tree of the plurality of plan trees, a hash value for each of the nodes to assign the calculated hash value to the corresponding each of the nodes;
   assigning a unique number different from the hash value and associated with a set of pointers to each of the nodes based on the hash value of each of the nodes; and
   listing subtrees below a node of the nodes having a same unique number in an associative array indexed by hash value, to extract the common plan subtree from the plurality of plan trees.

2. The extraction method according to claim 1, wherein the calculating includes sequentially calculating the hash value in a direction from a leaf node to a root node of the plan tree to assign the hash value to each of the nodes.

3. The extraction method according to claim 1, wherein the assigning includes sequentially assigning the unique number to each of the nodes in a direction from a leaf node to a root node of the plan tree.

4. The extraction method according to claim 1, further comprising:
   outputting the associative array that is indexed by the hash value, the associative array further including a set of pointers associated with each unique number; and
   listing nodes having the same unique number in association with a set of pointers corresponding to the same unique number to extract subtrees below the nodes that are listed as the common plan subtree.

5. The extraction method according to claim 1, further comprising:
   when two or more nodes have the same unique number:
      comparing node types, node children, and node attributes of the two or more nodes to determine if at least a subset of the two or more nodes are the same, assigning a different unique number to nodes of the two or more nodes that are not the same.

6. The extraction method according to claim 5, wherein the hash values are truncated to 32-bit integers.

7. The extraction method according to claim 6, wherein if the hash value has been calculated previously, the hash value is not calculated again during the calculating step.

8. The extraction method according to claim 7, wherein the two or more nodes are the same when all of the node types, the node children, and node attributes match one another.

9. The extraction method according to claim 8, wherein the at least the subset of the two or more nodes that are the same are nodes that perform a joining operation.

10. The extraction method according to claim 9, wherein nodes are sequentially added to the associative array.

11. An extraction apparatus configured to optimize multiple queries and reduce a time to extract a common plan subtree that is a common part among a plurality of plan trees corresponding to the multiple queries by avoiding use of acyclic graphs, the extraction apparatus comprising:
   first assignment circuitry configured to calculate, based on pieces of information of nodes of a plan tree of the plurality of plan trees, a hash value for each of the nodes to assign the calculated hash value to the corresponding each of the nodes;
   second assignment circuitry configured to assign a unique number different from the hash value and associated with a set of pointers to each of the nodes based on the hash value of each of the nodes; and
   extraction circuitry configured to list subtrees below a node of the nodes having a same unique number in an associative array indexed by hash value, to extract the common plan subtree from the plurality of plan trees.

12. A non-transitory computer readable medium storing a program configured to cause a computer to perform a method to optimize multiple queries and reduce a time to extract a common plan subtree that is a common part among a plurality of plan trees corresponding to the multiple queries by avoiding use of acyclic graphs, comprising:
   calculating, for a plurality of plan trees, based on pieces of information of nodes of a plan tree of the plurality of plan trees, a hash value for each of the nodes to assign the calculated hash value to the corresponding each of the nodes;
   assigning a unique number different from the hash value and associated with a set of pointers to each of the nodes based on the hash value of each of the nodes; and
   listing subtrees below a node of the nodes having a same unique number in an associative array indexed by hash value, to extract a common plan subtree from the plurality of plan trees, the common plan subtree being a common part among the plurality of plan trees.

* * * * *